United States Patent [19]

Bonfils

[11] Patent Number: 4,732,492
[45] Date of Patent: * Mar. 22, 1988

[54] BEARING RING FOR SUPPORTING ITEMS ON SOLID OR HOLLOW CYLINDRICAL PARTS

[75] Inventor: Georges Bonfils, St. Germain les Trois Cloches, France

[73] Assignee: S.F.E.N.A., Velizy Villacoublay, France

[ * ] Notice: The portion of the term of this patent subsequent to Mar. 24, 2004 has been disclaimed.

[21] Appl. No.: 857,269

[22] Filed: Apr. 30, 1986

Related U.S. Application Data

[62] Division of Ser. No. 602,642, Apr. 19, 1984, Pat. No. 4,651,402.

[30] Foreign Application Priority Data

Apr. 29, 1983 [FR] France ................................ 83 07108

[51] Int. Cl.⁴ ............................................. F16C 17/00
[52] U.S. Cl. .............................. 384/129; 29/149 S R; 29/446; 384/912
[58] Field of Search ................... 29/446, 149.5 R, 453; 384/276, 295, 129, 428

[56] References Cited

U.S. PATENT DOCUMENTS

| | | |
|---|---|---|
| 1,416,846 | 5/1922 | Leighton ................... 29/149.5 R X |
| 1,469,793 | 10/1923 | Johnson et al. ................ 29/149.5 R |
| 2,574,318 | 11/1951 | Burkhardt ........................ 384/276 X |
| 4,048,703 | 9/1977 | Lehnhart ......................... 384/276 X |
| 4,249,993 | 2/1981 | Stegelitz et al. ................ 384/276 X |
| 4,435,100 | 3/1984 | Cox ................................. 384/276 X |

Primary Examiner—Howard Goldberg
Assistant Examiner—Irene Cuda
Attorney, Agent, or Firm—Sughrue, Mion, Zinn, Macpeak and Seas

[57] ABSTRACT

The cylinder may be an aircraft landing gear axle. The items may be pick-ups the sense axle deformation. A ring (30) for supporting the pick-ups is made of highly resilient material. It is initially of such a size that its cylinder-engaging surface overlaps the cylindrical surface it is to engage. The ring is then deformed by urging at least two points (34 to 37) around its circumference to increase the degree of overlap. While maintaining the deforming force on the ring, its cylinder-engaging surface (31) is machined so that there is no longer any overlap, and still maintaining the force, the ring is engaged with the cylinder. The force is then removed. The said points move resiliently away from the cylinder, but intermediate points are consequently resiliently urged into contact with the cylinder. The contact is smooth and progressive, thus avoiding the kind of stress concentrations that could reduce cylinder life by fatigue, etc.

2 Claims, 10 Drawing Figures

BEARING RING FOR SUPPORTING ITEMS ON SOLID OR HOLLOW CYLINDRICAL PARTS

This is a division of application Ser. No. 602,642, filed Apr. 19, 1984, now U.S. Pat. No. 4,651,402 issued on Mar. 24, 1987.

The present invention relates to methods of making bearing rings providing support for items, such as pick-ups, for example, suitable for being disposed in the cylindrical inside portion of hollow parts, or around the cylindrical outside portion of solid or hollow parts.

BACKGROUND OF THE INVENTION

In some applications, and in particular in aeronautics, and more particularly in the manfucture of undercarriages or landing gear, it is sometimes necessary to place parts, such as force sensors, for example, on such landing gear in order to measure the deformations to which various parts of the landing gear are being subjected. This possibility is provided in particular, for forestalling various kinds of failure, and even, for measuring the total weight of an aricraft.

Of all these applications, one is of particular interest, namely measuring the total mass of an aircraft and/or its center of gravity and/or the stress to which its tires are subjected. This can be done, for example, by measuring the deformation of an axle in the aricraft landing gear. The axle may be constituted by a hollow cylindrical part, in which case, electromagnetic or capacitive sensors may be placed inside the axle to measure the deformation thereof and thus to enable the forces applied to the landing gear to be deduced. By analyzing a set of such forces, the mass of the aircraft can readily be deduced. This is of particular interest just prior to take off to see if the total starting weight is acceptable.

The problem to be solved is how to place such sensors inside an axle. Techniques known up to now have always suffered from drawbacks.

Two particular prior art techniques require:

Either providing at least two bearing regions on the axle for engaging sensor-supporting parts, with the bearing force resulting from the radial resilience of the axle and from screw displacement of one or more moving parts on the sensor-supporting part. Since the radial resilience of the axle is small, the bearing force is concentrated and varies greatly when the axle is deformed under load, which is a potential source of breakage and of accident.

Or else cavities are made in the axle and balls are received in the cavities. The same problem of potential stress concentrations leading to cracking and breakage remains.

Preferred implementations the present invention mitigate these drawbacks by ensuring that the pressure applied in the bearing regions remains practically constant in spite of possible deformation of the axle. This is achieved by using highly resilient bearing rings for supporting items such as deformation sensors. Further, stress concentrations are avoided.

SUMMARY OF THE INVENTION

The present invention provides a method of making a bearing ring for supporting an item inside a hollow cylindrical part in a first case, or outside a solid or a hollow cylindrical part in a second case, the method consisting in the following steps:

a first step of providing a ring of highly resilient material and having a cylinder-engaging surface of a diameter that overlaps the diameter of the corresponding ring-engaging surface of the cylinder, i.e. in the first case the ring outside diameter is greater than the cylinder inside diameter, and in the second case the ring inside diameter is less than the cylinder outside diameter;

a second step of applying forces to at least two points round the ring to elastically deform the ring in such a manner that the said overlap increases at said points, i.e. in the first case the ring outside diameter is increased at the said points by the deformation, and in the second case the ring inside diameter is decreased at the said points by the deformation;

a third step of machining the ring while still applying the said forces thereto, the machining being applied to the said deformed cylinder-engaging surface of the ring so that there is no overlap between the diameter thereof and the diameter of the corresponding ring-engaging surface of the cylinder, i.e. in the first case the deformed outside diameter is reduced, and in the second case the deformed inside diameter is increased;

a fourth step of engaging the machined ring with the cylinder while still applying the said forces thereto, i.e. placing the ring inside the cylinder in the first case, and around the cylinder in the second case; and a fifth step of releasing the ring from the action of the said forces.

The invention also provides a bearing ring made by the above-defined method.

BRIEF DESCRIPTION OF THE DRAWINGS

An implemenation of the invention is described by way of example with reference to the accompanying drawings, in which.

MORE DETAILED DESCRIPTION

Figure 1:
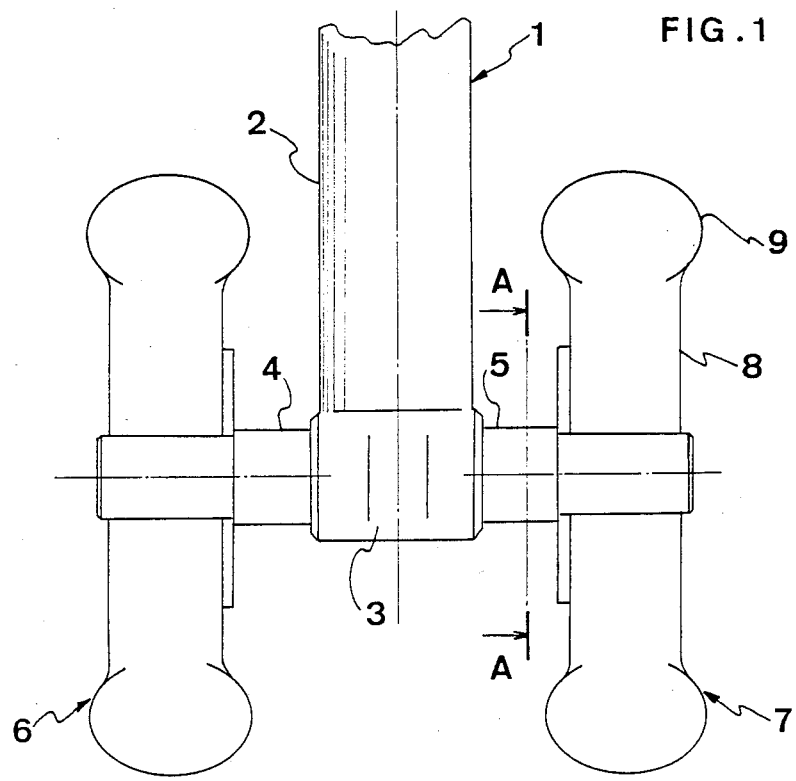
FIG. 1 is a diagram of an aircraft landing gear suitable for receiving a bearing ring in accordance with the invention for measuring, for example, the deformation of an axle on which a wheel is mounted.

FIG. 1 shows the bottom portion of an aircraft landing gear 1, having a leg 2 with a bottom end 3 to which an axle is fixed. The axle is visible at 4 and 5, and has running means 6 and 7 fixed to each end thereof. The running means is commonly in the form of a hub 8 and a pneumatic tire 9.

Figure 2:
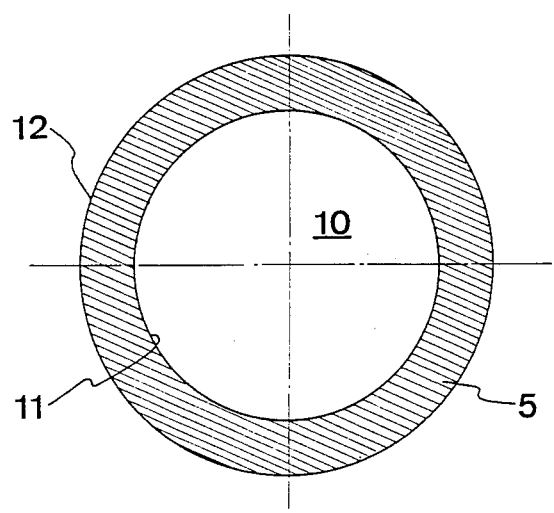
FIG. 2 is a cross section through a landing gear axle taken in a plane A—A of FIG. 1.

In some applications there is a need to know the total mass of an aricraft on the ground, so as to know its take off weight. This information can be deduced from measurements of the forces acting on some of the axles on which ground-contacting wheels are mounted. By combining measurements from several axles, the total mass of the aircraft can be determined. The axle 4, 5 is generally made up of hollow cylindrical parts and/or hollow conical parts. FIG. 2 is a cross section through the axle portion 5 taken plane A—A of FIG. 1, it shows the hollow interior 10 of the axle 5. In many applications it is advantageous to mask the equipment associated with the landing gear as much as possible, which is why any force pick-ups or sensors should preferably be located inside the axle 5. In which case there is a problem of how to fix the sensors or other parts in the axle interior 10, e.g. on the axle wall 11.

The invention provides bearing rings which can be mounted inside such an axle 5 and which co-operate suitably with the inside wall 11 thereof without causing damage. The following example concerns a bearing ring suitable for mounting inside a hollow cylinder, but the person skilled in the art would have no difficulty in adapting the same method to making a ring for mounting on the outside of a cylindrical part when it is not possible to mount it on the inside. In other words the bearing ring could be mounted on the outside wall 12, even though it is generally much preferred in aeronautics to mount it in the interior 10.

FIGS. 3A to 3F show different stages in the method of making a bearing ring in accordance with the invention. Starting with FIG. 3A, a ring 30 of highly resilient material which is advantageously made in a single closed piece, has an axle-contacting diameter which overlaps the corresponding diameter of the axle 5. In other words, an inside-mounted bearing ring has an outside diameter 31 which is slightly greater than the diameter of the inside wall 11 of the axle 5, while an outside mounted ring would have an inside diameter slightly smaller than the outside wall 12. In some applications the ring is not closed, but is in openable like a spring clip. The thickness 32 of the ring is determined as a function of various considerations which the person skilled in the art will have no difficulty in determining for any given application.

Once the ring has been made, and keeping with the inside mounted example, forces are applied at regularly spaced 90° intervals round the inside of the ring (see FIG. 3B) to deform the ring in an accurately predetermined manner which is explained below. In the specific example shown, the means 33 for applying the deforming forces comprise four shoes 34, 35, 36, and 37 pivotally mounted on respective screws 38, 39, 40, and 41 which co-operate with respective nuts 42, 43, 44, and 45 which are themselves free to rotate relative to a base 46. Thus, by rotating the nuts, the screws are displaced along orthogonal axes 50 and 51, thereby displacing the shoes 34 to 37.

Figure 3A:
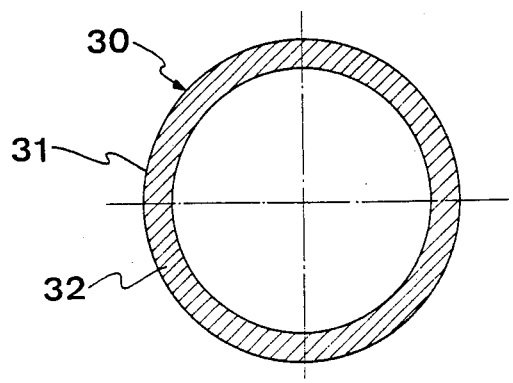
FIGS. 3A, 3B, 3C, 3D, 3E and 3F show different stages in the method of preparing a bearing ring in accordance with the invention.
Figure 3B:
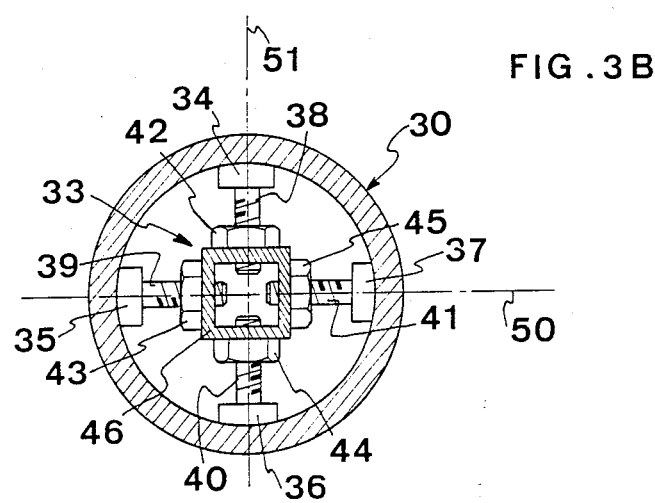
Figure 3C:
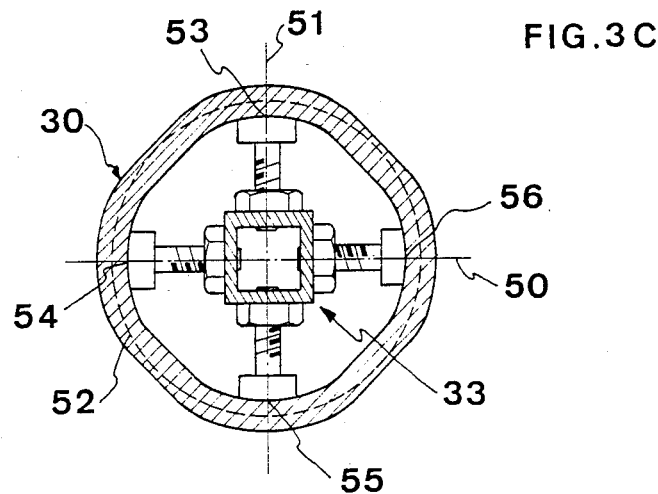

Once the means 33 have been positioned in the ring 30, the shoes are moved outwardly along the orthogonal axes 50 and 51 so as to increase the ring diameter along these axes and so as to deform the ring into the curvilinear shape shown in FIG. 3C. The deformation applied is such as to ensure that the inside diameter of the axle 5, i.e. the surface of the inside wall 11, remains within the thickness of the ring material as shown by a dashed line 52 in FIG. 3C. In other words, when the four portions 53, 54, 55, and 56 of the ring are pushed outwardly, the intermediate portions half way between them tend to move inwardly and thus take up a smaller diameter than before.

Figure 3D:
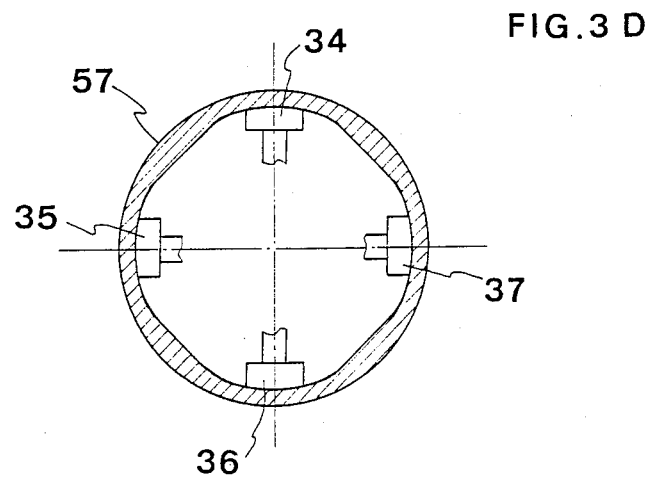
Figure 3E:
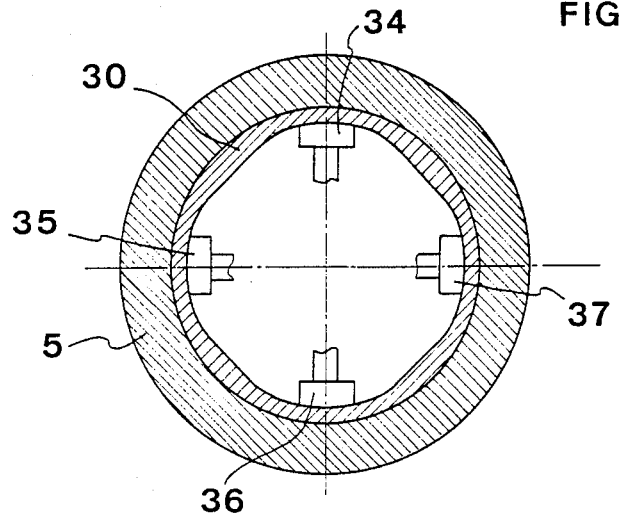
Figure 3F:
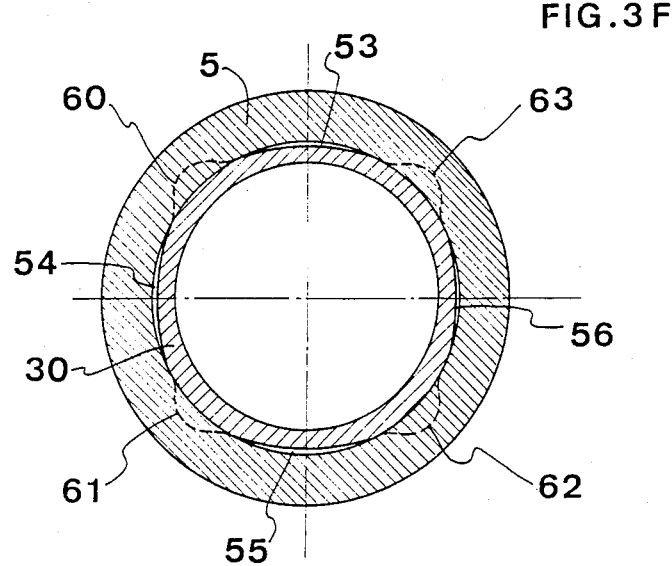

Once the ring has been deformed to an extent which will generally be defined by experiment, the deformed ring, while still subjected to the deforming forces, is machined so that its axle-engaging surface is made equal to to the diameter of the corresponding axle surface. Advantageously, the machining continues far enough to ensure that there is no overlap at all. FIG. 3D shows an outside ring surface 57 which is of slightly smaller diameter then the cylindrical inside surface of the axle inside wall 11. The excess metal outside the dashed line 52 in FIG. 3C is removed by means of lathe, for example. The resulting ring as shown in FIG. 3D, and still subjected to the deforming force, is thus capable of being inserted inside the axle 5 as shown in FIG. 3E.

Once the ring has been suitably positioned inside the axle 5, the means 33 are released, i.e. the nuts are turned so that the shoes 34 to 37 move radially inwardly. Its resilience will then cause the ring to tend towards the opposite deformation, in other words the said intermediate portions 60, 61, 62 and 63 will press firmly against the wall of the axle, while possibly leaving the previously outwardly urged points 53, 54, 55 and 56 slightly clear of the inside wall 11 of the axle (the clearance has been exaggerated for clarity, while the dashed lines at the points of pressure contact represent the envelope of the forces applied to the inside wall of the axle 5).

Under such conditions, the ouside surface of the ring has low amplitude corrugations which nevertheless cause the ring to press resiliently against four regions of the inside wall and thus hold the ring firmly in place. In particular, there is no need to make grooves or notches in the inside surface of the axle which could seriously shorten the lifetime of the axle, i.e. by providing stress concentrations that are particularly damaging in fatigue when high forces are applied to the axle as during landing.

The envelopes of the forces applied to the inside wall 11 of the axle vary smoothly, thus avoiding any damaging concentration of forces that could lead to a hairline cracks and ultimately to axle failure.

Thus, once a ring is placed inside an axle, all sorts of devices such as pick-ups may be mounted inside the axle by various means, including conventional screws.

Figure 4A:
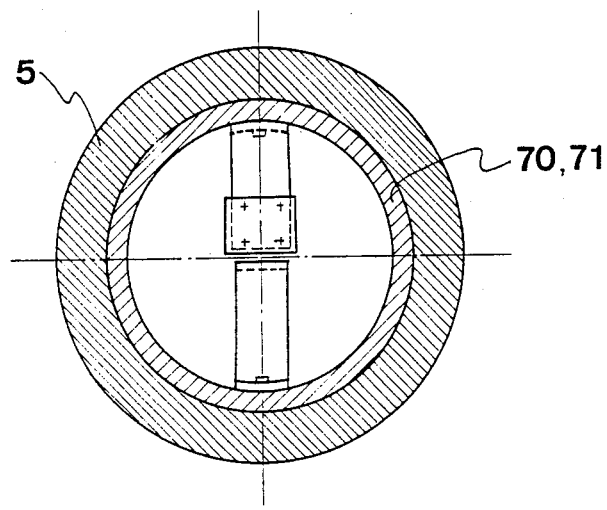
FIGS. 4A and 4B are a cross section and a longitudinal section respectively through an application of a bearing ring in accordance with the invention to supporting sensors inside an axle as shown in FIG. 1. This application is given merely by way of one example of one use for a bearing ring in accordance with the invention.
Figure 4B:
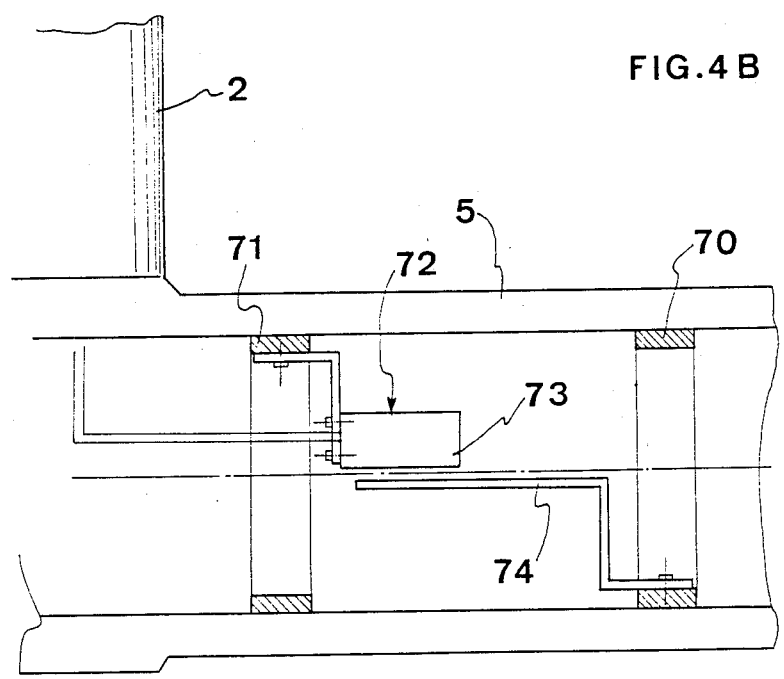

FIGS. 4A and 4B are respectively a cross section and a longitudinal section through an axle 5 fitted with means for measuring axle deformation. There are two bearing rings 70 and 71 mounted inside the axle, at a predetermined distance apart. Complemetary parts 73 and 74 of a pick-up 72, e.g. a magnetic or a capacitive sensor, are mounted on each ring. For example, the part 73 which is fixed to the ring 71 is placed facing the part 74 which is constituted by an active plate. When the axle is deformed the spacing between the pick-up parts varies by an amount which can readily be determined by the person skilled in the art. Given a variable distance separating the two parts of the pick-up, corresponding variations will occur in an electrical signal, which is duly transmitted to a calculator or computer on board the aircraft.

Advantageously, an outside surface of the ring where it makes contact with the inside of the axle will be toroidal in shape, as is well known.

I claim:

1. In combination, a metal bearing ring and a hollow metal cylindrical part supporting said ring outside or outside said hollow metal cylindrical part, said bearing ring being formed and mounted to said hollow metal cylindrical part by the method comprising the following steps:

providing said ring of highly resilient metal having a cylinder-engaging surface of a diameter that overlaps the diameter of the corresponding ring-engaging surface of said cylindrical metal part;

applying localized forces to at least two circumferentially spaced points on the ring to locally, elastically deform the ring such that said overlap increases at said points and wherein said overlap decreases at other circumferentially spaced points intermediate said at least two circumferentially spaced points;

machining the deformed cylindrical part-engaging surface of the ring while applying said localized forces thereto during and after said machining, so that there is no overlap between the diameter thereof and the diameter of the corresponding ring-engaging surface of said cylindrical part;

engaging the machined metal ring against the metal cylindrical part while still applying said localized forces thereto; and removing the applied forces;

such that before machining, a first set of exterior forces produces a series of elastic deformations at certain points within said ring and a series of reverse elastic deformations at said other points, and after machining and after assembly, a second set of internal forces within said ring produces a series of elastic deformations at said other circumferential points defining on said surface of said ring abutting said hollow metal cylindrical part low amplitude corrugations which press resiliently against said hollow metal cylindrical part at said other points without stress concentrations at said other points leading to an attendant fatigue damage to said metal bearing ring and metal cylindrical part assembly thereby insuring the deformation holding of the metal bearing ring and hollow metal cylindrical part assembly.

2. In combination, a metal bearing ring and a solid metal cylindrical part supporting said ring outside said solid metal cylindrical part, said bearing ring being formed and mounted to said solid metal cylindrical part by the method comprising the following steps:

providing said ring of highly resilient metal having a cylinder-engaging surface of a diameter that overlaps the diameter of the corresponding ring-engaging surface of said cylindrical metal;

applying localized forces to at least two circumferentially spaced points on the ring to locally, elastically deform the ring such that said overlap increases at said points, and wherein said overlap decreases at other circumferentially spaced points intermediate said at least two circumferentially spaced points;

machining the deformed cylindrical part-engaging surface of the ring while applying said localized force thereto during and after said machining, so that there is no overlap between the diameter thereof and the diameter of the corresponding ring-engaging surface of said cylindrical part;

engaging the machined metal ring against the metal cylindrical part while still applying said localized forces thereto;

and removing the applied forces;

such that before machining, a first set of exterior forces produces a series of elastic deformations at certain points within said ring and a series of reverse elastic deformations at said other points, and after machining and after assembly, a second set of internal forces within said ring produces a series of elastic deformations at said other circumferential points, defining on said surface of said ring abutting said hollow metal cylindrical part low amplitude corrugations which press resiliently against said hollow metal cylindrical part at said other points without stress concentrations at said other points leading to an attendant fatigue damage to said metal bearing ring and metal cylindrical part assembly thereby insuring the deformation holding of the metal bearing ring and solid metal cylindrical part assembly.

* * * * *